United States Patent
Lee et al.

(10) Patent No.: US 11,225,615 B2
(45) Date of Patent: Jan. 18, 2022

(54) METHOD OF DESALTING CRUDE OIL WITH IMPROVED IRON (FE) REDUCTION PERFORMANCE

(71) Applicants: SK Innovation Co., Ltd., Seoul (KR); SK Energy Co., Ltd., Seoul (KR)

(72) Inventors: Yun Hee Lee, Daejeon (KR); Joo Won Park, Daejeon (KR)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 0 days.

(21) Appl. No.: 16/919,229

(22) Filed: Jul. 2, 2020

(65) Prior Publication Data

US 2021/0002561 A1  Jan. 7, 2021

(30) Foreign Application Priority Data

Jul. 4, 2019 (KR) .................. 10-2019-0080663

(51) Int. Cl.
| | |
|---|---|
| *C10G 33/08* | (2006.01) |
| *C10G 33/04* | (2006.01) |
| *C10G 33/02* | (2006.01) |
| *C10G 33/06* | (2006.01) |
| *B01D 17/04* | (2006.01) |

(52) U.S. Cl.
CPC .......... *C10G 33/08* (2013.01); *B01D 17/047* (2013.01); *C10G 33/02* (2013.01); *C10G 33/04* (2013.01); *C10G 33/06* (2013.01); *B01D 2251/20* (2013.01); *C10G 2300/205* (2013.01); *C10G 2300/80* (2013.01)

(58) Field of Classification Search
CPC ........ C10G 33/02; C10G 33/04; C10G 33/06; C10G 33/08
See application file for complete search history.

(56) References Cited

U.S. PATENT DOCUMENTS

| | | | | |
|---|---|---|---|---|
| 5,612,490 | A * | 3/1997 | Carlson .............. | G01N 33/2823 73/61.43 |
| 2011/0172473 | A1 * | 7/2011 | Nguyen ................. | C10G 31/08 585/3 |
| 2012/0181218 | A1 * | 7/2012 | Chakka ................. | C10G 33/06 208/188 |
| 2014/0251874 | A1 * | 9/2014 | Barroeta ............... | C10G 33/08 208/298 |
| 2014/0353214 | A1 * | 12/2014 | Daage ................... | C10G 21/08 208/298 |
| 2015/0090556 | A1 * | 4/2015 | Love .................... | B01D 21/009 196/46 |
| 2018/0346826 | A1 * | 12/2018 | Legaspi Felipe ..... | C10G 33/02 |

* cited by examiner

*Primary Examiner* — Renee Robinson
(74) *Attorney, Agent, or Firm* — The Webb Law Firm

(57) ABSTRACT

Provided is a method of desalting crude oil capable of effectively removing metal impurities in the crude oil and a rag layer which is formed in a crude oil desalting process.

12 Claims, 2 Drawing Sheets

METHOD OF DESALTING CRUDE OIL WITH IMPROVED IRON (FE) REDUCTION PERFORMANCE

CROSS-REFERENCE TO RELATED APPLICATION

This application claims priority to Korean Patent Application No. 10-2019-0080663 filed Jul. 4, 2019, the disclosure of which is hereby incorporated by reference in its entirety.

TECHNICAL FIELD

The following disclosure relates to a method of desalting crude oil.

BACKGROUND

Crude oil is usually contaminated with metal impurities such as iron, calcium, zinc, silicon, nickel, sodium, and potassium. In the case in which these metal impurities are not removed beforehand, the impurities may be attached to or deposited on oil refining process equipment to cause fouling or form corrosive salts which are harmful to the oil refining process equipment. In addition, the metal impurities may act as a harmful material to a catalyst used in an oil refining process to decrease the efficiency of an oil refining process.

Therefore, the metal impurities in crude oil should be removed beforehand, and thus, an oil refining process essentially involves a crude oil desalting process.

To briefly explain a general crude oil desalting process, first, a small amount of water is introduced to crude oil to be desalted and mixed to form a water in oil emulsion. This provides close contact between crude oil and water drops, so that metal impurities in the crude oil easily escape into water drops. Next, the emulsion is introduced to a desalter vessel, and subjected to oil-water separation to be separated into an upper desalted oil layer and a lower water layer. Thereafter, the upper desalted oil is discharged into subsequent process equipment.

However, in a general crude oil desalting process, only a water-soluble salt such as sodium chloride or potassium chloride among metal impurities in the crude oil may be removed. Therefore, a significant amount of metal impurities, for example, oil-wetter metal particles of which the outer surface is surrounded by oil, water-insoluble metal salt, and the like, are present in desalted oil. These are continuously discharged into subsequent process equipment together with desalted oil to negatively affect an oil refining process. Therefore, these metal impurities need to be further removed.

In addition, the metal impurities described above stabilize an emulsion to interfere with oil-water separation and assist formation of a stable emulsion layer often called a rag layer. A rag layer is formed between an upper desalted oil layer and a lower water layer, and may gradually thicken in a continuous desalting process. An excessively thickened rag layer may be discharged into subsequent process equipment together with the desalted oil in the upper layer. This decreases the purity of the desalted oil to decrease the efficiency of an oil refining process. In addition, the rag layer is discharged together with water in the lower layer and may cause a problem in a waste water treatment process. Thus, the rag layer also needs to be removed.

In particular, western African crude oil (Doba, Kuito), North sea crude oil (Heidrum, Captain), North American crude oil (San Joaquin Valley), Indonesian crude oil (Serang), Chinese crude oil (Bohai, Shengli), and the like are opportunity crude oil having low quality which contains a large amount of metal impurities, and thus, the problems described above become worse.

Accordingly, in a desalting process of crude oil, in particular, opportunity crude oil, development and securement of technology to effectively treat metal impurities and a rag layer are urgently needed.

SUMMARY

An embodiment of the present invention is directed to providing a method of desalting crude oil capable of effectively removing metal impurities in the crude oil and a rag layer which is formed in a crude oil desalting process.

In one general aspect, a method of desalting crude oil includes: (a) introducing an emulsion including crude oil, water, and an iron (Fe) reducing agent to a desalter vessel; (b) subjecting the emulsion to oil-water separation to form a desalted oil layer, a water layer, and a rag layer in which iron impurities are concentrated; (c) confirming a position and a thickness of the rag layer to determine removal timing of the rag layer; and (d) removing the rag layer.

In an exemplary embodiment of the present invention, step (c) may be to use a plurality of try cocks which is attached to positions of different heights from each other of the desalter vessel.

In some exemplary embodiments, the plurality of try cocks may be attached to positions of a 20 to 60% height with respect to a total height of the desalter vessel.

In an exemplary embodiment of the present invention, step (c) may be to use a density profiler installed in the desalter vessel.

In an exemplary embodiment of the present invention, step (d) may be performed when an interface between the rag layer and the desalted oil layer is formed at a position of a 40 to 50% height with respect to the total height of the desalter vessel.

In an exemplary embodiment of the present invention, step (d) may be performed when the rag layer has a 10 to 30% thickness with respect to the total height of the desalter vessel.

In an exemplary embodiment of the present invention, step (d) may be to use any one or more outlets which are attached to a position confirmed as the rag layer in step (c), among a plurality of outlets attached to positions of different heights from each other of the desalter vessel.

In some exemplary embodiments, the plurality of outlets may be attached to positions of a 20 to 60% height with respect to the total height of the desalter vessel.

In some exemplary embodiments, in step (d), a density profiler installed in the outlet used for removing the rag layer may be used to prevent the desalted oil layer from being removed together when the rag layer is removed.

In an exemplary embodiment of the present invention, after step (d), the method may further include (e) retreating the removed rag layer.

In an exemplary embodiment of the present invention, step (e) may include centrifuging the removed rag layer to form an oil layer, a water layer, and a cake layer.

In some exemplary embodiments, the centrifugation may be performed at a temperature of 70 to 90° C.

Other features and aspects will be apparent from the following detailed description, the drawings, and the claims.

DETAILED DESCRIPTION OF EMBODIMENTS

Figure 1:
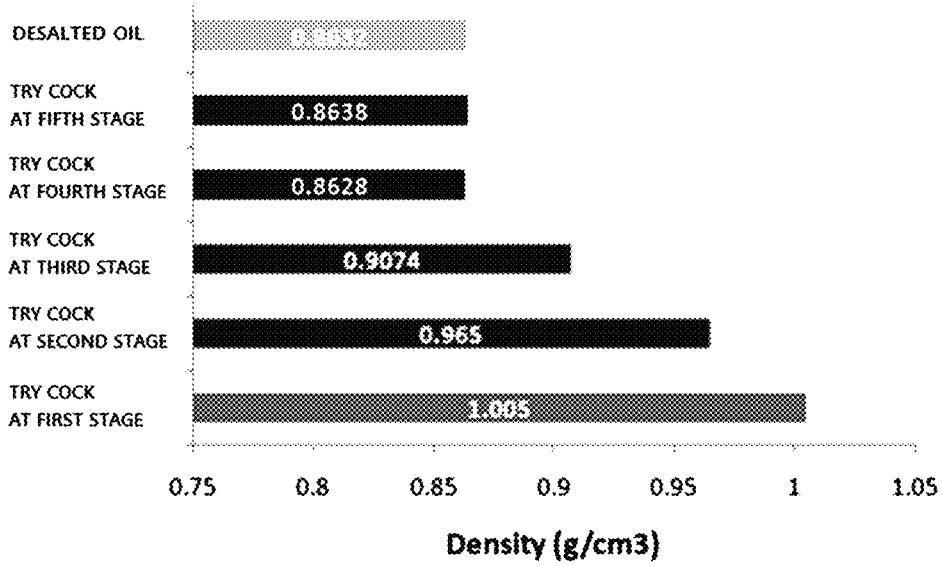
FIG. 1 is a graph showing results of measuring a density of a sample of Example 1.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

"Iron (Fe) impurities" herein may refer to iron particles, water-soluble iron salts, and water-insoluble iron salts.

A "total height of a desalter vessel" herein may refer to a length from a lowest end to an uppermost end of the desalter vessel.

A "height" herein may refer to a length from the lowest end of the desalter vessel.

A "thickness of a rag layer" herein may refer to a length between a lowest point of a lower interface and a highest point of an upper interface of the rag layer.

An "upper interface of a rag layer" may refer to an interface between the rag layer and a desalted oil layer and a "lower interface of a rag layer" may refer to an interface between the rag layer and a water layer.

"%" herein may refer to a length %, unless otherwise defined.

Hereinafter, the present invention will be described in detail.

The present invention relates to a method of desalting crude oil capable of effectively removing metal impurities (in particular, iron impurities) in the crude oil and a rag layer which is formed in a crude oil desalting process.

Specifically, the present invention provides a method of desalting crude oil including: (a) introducing an emulsion including crude oil, water, and iron (Fe) reducing agent to a desalter vessel; (b) subjecting the emulsion to oil-water separation to form a desalted oil layer, a water layer, and a rag layer in which iron impurities are concentrated; (c) confirming a position and a thickness of the rag layer to determine removal timing of the rag layer; and (d) removing the rag layer.

The present invention allows iron impurities present in crude oil to be concentrated in a large amount in a rag layer and removed at once. Thus, two elements which negatively affect a crude oil desalting process may be efficiently and effectively removed. In addition, a high-purity desalted oil layer may be provided by subsequent process equipment. In particular, the position and the thickness of the rag layer may be confirmed to remove the rag layer at optimal timing, thereby maximizing the efficiency of the crude oil desalting process.

Hereinafter, each step of the present invention will be described in detail.

Step (a) of the present invention is to introduce an emulsion including crude oil, water, and an iron reducing agent to a desalter vessel.

The emulsion is not particularly limited, but may be prepared by emulsifying a mixture including crude oil, water, and an iron reducing agent by a mixing valve.

Here, the mixture is not particularly limited, but may be prepared by introducing water and the iron reducing agent to the crude oil transferred to the desalter vessel.

Step (b) is a step of subjecting the emulsion to oil-water separation to form a desalted oil layer, a water layer, and a rag layer in which iron impurities are concentrated. A rag layer is a stable emulsion layer and usually formed between an upper desalted oil layer and a lower water layer. The rag layer of the present invention is characterized in that a large amount of iron impurities are concentrated therein due to the iron reducing agent.

As a method of subjecting the emulsion to oil-water separation, various physical and chemical methods which may be employed in the art may be adopted and applied. As a specific example, introduction of a demulsifier, electrostatic coalescence using an electric field, and the like may be employed.

The iron reducing agent of the present invention may be for forming a rag layer in which iron impurities are concentrated in a large amount. That is, any iron reducing agent may be employed as the iron reducing agent of the present invention without limitation, as long as it may form the rag layer.

However, for example, though not limited to the mechanism, oil-wetter iron particles having an oil film are dispersed in a large amount in crude oil, and when the oil film is removed, the iron particles may be concentrated in the rag layer. Therefore, any compound may be employed as the iron reducing agent of the present invention, as long as it may remove the oil film of oil-wetter iron particles.

For example, the compound may be a compound containing at least one heteroatom. Here, the heteroatom may be any one or more selected from oxygen (O), sulfur (S), and the like.

As a more specific example, the compound may be a polymer compound having a structure containing at least one heteroatom as a repeating unit.

For example, the compound may be any one or more selected from polyol, polyether, polyhydroxy acid, polythiol, polysulfide, polysulfate, and the like. Of course, the present invention is not limited thereto.

In addition, as commercially available products, for example, EC2703A and EC2630A available from Nalco and the like, may be employed as the iron reducing agent of the present invention.

In the present invention, the content of the iron reducing agent in the emulsion may not be particularly limited. Since the content varies depending on various factors such as the content of iron impurities in crude oil, the temperature and pressure conditions of the crude oil desalting process, and the specific structure of the iron reducing agent, for example, the number of heteroatoms of the iron reducing agent, it is difficult to expect the content in advance. However, usually, as the content of the iron impurities in the crude oil is higher, the content of the iron reducing agent should also be increased.

Step (c) of the present invention is a step of confirming the position and the thickness of the rag layer to determine the removal timing thereof.

The rag layer in the crude oil desalting process may be gradually thickened and particularly in the case of an opportunity crude oil containing a large amount of metal impurities, this phenomenon becomes more serious. The rag layer may extremely decrease the efficiency of the oil refining process and the crude oil desalting process, unless the rag layer is not removed at appropriate timing. Step (c) is for preventing the phenomenon, and is to confirm the position and the thickness of the rag layer to determine optimal removal timing.

In an exemplary embodiment of the present invention, step (c) may be to use a plurality of try cocks which is attached to positions of different heights from each other of the desalter vessel.

More specifically, step (c) may be to use the plurality of try cocks to sample a component in the desalter vessel to confirm the position and the thickness of the rag layer. The rag layer of the present invention is characterized in that a large amount of iron impurities are concentrated therein due to the iron reducing agent. Thus, since it may be visually easily determined whether the component of a sample is a desalted oil or a rag, the position of the rag layer may be simply confirmed without separate analysis.

In some exemplary embodiment, in step (c), after sampling using the try cocks, measuring of a sample density may be further performed. This was based on the fact that while the density of the desalted oil layer is about 0.85 and the density of the water layer is about 1.0, the density of the rag layer of the present invention is 0.90 to 0.98 since a large amount of iron impurities are concentrated therein. In particular, since the rag layer of the present invention contains a large amount of iron impurities, it has a characteristic of having a clearer interface with the desalted oil layer. This allows significantly high accuracy to be secured in confirmation of the distinction, the position, and the thickness of the rag layer.

In some exemplary embodiments, the plurality of try cocks may be attached to positions of a 20 to 60%, more preferably a 20 to 50% height with respect to a total height of the desalter vessel. In this case, a plurality of try cocks is intensively distributed in a position where the rag layer is usually formed in the crude oil desalting process, so that the position and the thickness of the rag layer may be more clearly confirmed.

In some exemplary embodiment, the number of the plurality of try cocks may be 2 to 6, and more preferably 3 to 5.

In an exemplary embodiment of the present invention, step (c) may be to use a density profiler installed in the desalter vessel. In this case, the density of the component in the desalter vessel is measured in real time, thereby confirming the position and the thickness of the rag layer in real time. Here, the iron reducing agent of the present invention concentrates a large amount of iron in the rag layer, thereby securing significantly high accuracy in the confirmation of the position and the thickness of the rag layer through a density profiler.

The density profiler may refer to a device for measuring a density in real time. As the density profiler, for example, Tracero available from Johnson Matthey, Nitus available from Thermo Fisher Scientific, and the like which are commercially available, may be employed.

In an exemplary embodiment of the present invention, the time when the upper interface of the rag layer is formed at the position of a 40 to 50% height with respect to the total height of the desalter vessel may be determined as the removal timing of the rag layer.

That is, in an exemplary embodiment of the present invention, step (d) may be performed when the upper interface of the rag layer is formed at the position of a height satisfying the above range. In this case, since a part of the rag layer may be effectively prevented from escaping into subsequent process equipment together with the upper desalted oil layer, the efficiency of the crude oil desalting process may be increased.

In addition, in an exemplary embodiment of the present invention, the time when the rag layer has a 10 to 30% thickness, more preferably a 10 to 20% thickness with respect to the total height of the desalter vessel may be determined as the removal timing of the rag layer.

That is, in an exemplary embodiment of the present invention, step (d) may be performed when the thickness of the rag layer satisfies the range. In this case, the phenomenon that the rag layer is excessively thickened, so that a part of the rag layer escapes into the subsequent process equipment together with the desalted oil layer, may be prevented. In addition, when a removal method through an outlet is adopted, the phenomenon that the rag layer is excessively thin, so that the desalted oil in the upper layer is removed together, may be prevented. Thus, the rag layer may be more easily, selectively, and efficiently removed, and the efficiency of the crude oil desalting process may also be improved.

In the present invention, in the determination of the removal timing of the rag layer, whether hunting of a demineralizer current value occurs, when the iron removal rate of the desalted oil is decreased or reversed, and the like may be considered.

Step (d) of the present invention is a step of removing the rag layer. Here, removal may refer to removal of a part of the rag layer as well as removal of the entire rag layer.

Here, as a method of removing the rag layer, any physical or chemical method which may be employed in the art may be adopted and applied without particular limitation.

For example, step (d) may be a chemical method of separating the rag layer by an anti-emulsifying agent, or a physical method of discharging the rag layer out of the desalter vessel. However, since the rag layer of the present invention contains a large amount of iron impurities, a method of physically discharging may be preferred.

In an exemplary embodiment of the present invention, step (d) may be to use a plurality of outlets which is attached to positions of different heights from each other of the desalter vessel.

More specifically, among the plurality of outlets, any one or more outlets attached to the position which has been confirmed as the rag layer in step (c) may be used. That is, any one or more outlets attached to the position below the upper interface and above the lower interface of the rag layer may be used. In this case, the rag layer may be more easily and selectively removed.

In some exemplary embodiments, the plurality of outlets may be attached to the positions of a 20 to 60%, more preferably a 20 to 50% height with respect to a total height of the desalter vessel. This takes into consideration the position where the rag layer is usually formed in the present invention.

In some exemplary embodiment, the number of the plurality of outlets may be 2 to 5, and more preferably 2 to 4.

In some exemplary embodiments, in step (d), a density profiler installed in the outlet used for removing the rag layer may be used to prevent the desalted oil layer from being removed together when the rag layer is removed. This is for selectively removing the rag layer more clearly using a density difference between the rag layer and the desalted oil layer.

More specifically, the rag layer of the present invention has a large amount of iron concentrated therein to represent a density of 0.90 to 0.98, while the desalted oil layer represents a density of about 0.85. Therefore, when the rag layer is removed through the outlet, the density of the component discharged into the density profiler is confirmed, and when the density is out of the range of the density of the rag layer, the outlet is blocked, thereby significantly preventing discharge of the desalted oil.

In some exemplary embodiment, the density profiler may be installed in all of the plurality of outlets.

In some exemplary embodiment, the density profiler may be installed only in the outlet attached to the position of a 20 to 50% height, more preferably a 20 to 40% height with respect to the total height of the desalter vessel. This takes into consideration the position of the outlet where the rag layer is usually removed, but the present invention is not limited thereto.

In an exemplary embodiment of the present invention, after step (d), the method may further include (e) retreating the removed rag layer.

The retreatment method may be subjecting the removed rag layer to oil-water separation again, and as the oil-water separation method herein, any method which may be employed in the art may be adopted and applied without particular limitation. For example, the retreatment method may be any one or more selected from natural separation by gravity, separation by electrostatic coalescence, separation using centrifugation and an anti-emulsifying agent, and the like.

In some exemplary embodiment, step (e) may include a step of centrifuging the rag layer to form an oil layer, a water layer, and a cake layer.

In some exemplary embodiments, the centrifugation may be performed in a temperature range of 70 to 90° C. In this case, as confirmed in the Examples described later, an effect of significantly increasing retreatment efficiency is shown, which is particularly preferred in the present invention.

Hereinafter, the Examples and the Comparative Examples of the present invention will be described. However, the following Examples are only an exemplary embodiment of the present invention, and the present invention is not limited thereto.

Example 1

A crude oil desalting process was performed in a desalter vessel to which try cocks were vertically attached at first to fifth stages.

The total height of the desalter vessel was 3658 mm, and each try cock was attached to the position of heights of 1117 mm at the first stage, 1371 mm at the second stage, 1625 mm at the third stage, 1879 mm at the fourth stage, and 2133 mm at the fifth stage.

Crude oil (Kuwait, Arabian Medium, Eagle Ford, and the like) was introduced into the desalter vessel through a first pipe connected to the desalter vessel. Here, wash water and an iron reducing agent (Nalco, EC2703A & EC2630A, 5 to 20 ppm) were introduced to the crude oil through a second pipe connected to the first pipe. The crude oil, the wash water, and the iron reducing agent were emulsified by a mixing valve installed in the middle of the first pipe and introduced into the desalter vessel.

The emulsion introduced into the desalter vessel was separated into a desalted oil layer, a water layer, and a rag layer by electrostatic coalescence by an electric field applied into the desalter vessel.

Thereafter, the components in the desalter vessel at the corresponding position were sampled through each try cock. In addition, the desalted oil discharged from the desalter vessel to subsequent process equipment was sampled. The sample was analyzed as follows:

[Measurement of Density of Sample]

The density of each sample was measured. The density was measured using Mettler Toledo DM40 Density Meter, and the results are shown in FIG. 1.

[Observation of Sample by Optical Microscope]

Figure 2:
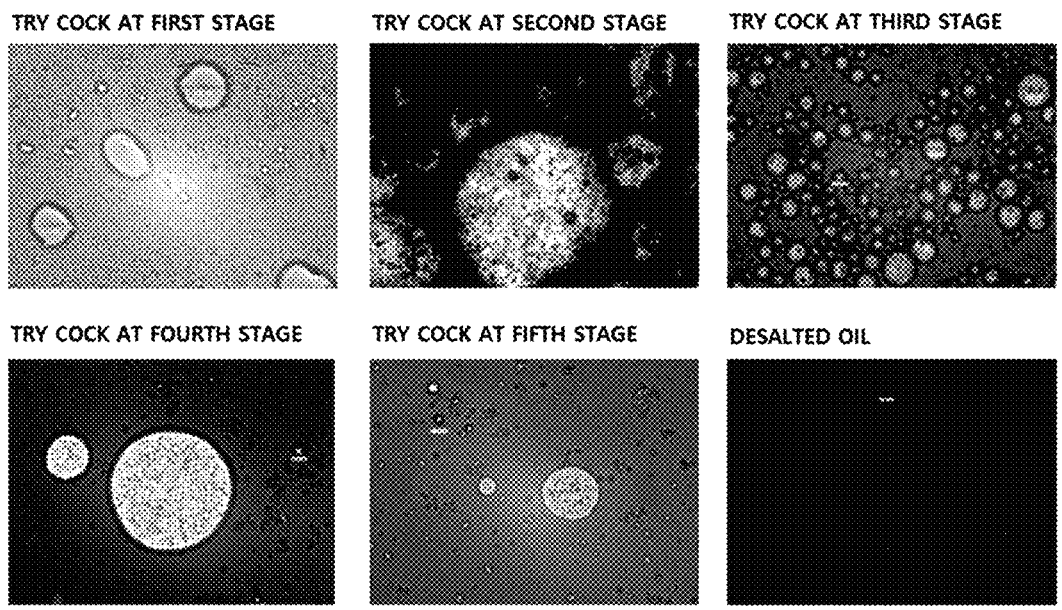
FIG. 2 is a photograph of a sample of Example 1 which was taken by an optical microscope.

Each sample was observed using an optical microscope (Leica DM2700 M RL/TL), and the results were taken and are shown in FIG. 2.

[Measurement of TSS Content of Sample]

A total suspended solid (TSS) content of each sample was measured according to ASTM D4807-05, and the results are shown in Table 1.

Here, since the try cock samples at the second and the third stages had a very high TSS content, only ¼ and ⅓ of the whole samples were filtered, respectively and measured, and the resultant values were corrected.

[Analysis of Metal Component of Sample]

The metal component of each sample was analyzed according to ASTM D5708-12, and the results are shown in Table 2.

<Analysis of Position of Rag Layer>

The position of the rag layer was estimated using the results of density measurement for each sample in Example 1. This was based on the fact that while the density of the desalted oil is about 0.85 and the density of water is about 1.0, the density of the rag of the present invention in which iron impurities were concentrated was 0.90 to 0.98.

It was confirmed from FIG. 1 that the density of the try cock samples at the second and third stages was 0.9650 and 0.9074, respectively. That is, it is presumed that the rag layer was formed in the desalter vessel corresponding to the position of the try cocks at the second and third stages.

More specifically, since the density of the try cock sample at the first stage was 1.005, it was found that the component in the desalter vessel corresponding to the position of the try cock at the first stage was water. Therefore, a water layer would be formed in the desalter vessel at the corresponding position. In addition, since the density of the try cock sample at the fourth stage was 0.8628, it was found that the component in the desalter vessel corresponding to the position of the try cock at the fourth stage was desalted oil. Therefore, a desalted oil layer would be formed in the desalter vessel at the corresponding position.

That is, it was found that the upper interface of the rag layer was formed at the position between the try cocks at the third stage and the fourth stage in the desalter vessel, and the lower interface of the rag layer was formed at the position between the try cocks at the first stage and the second stage.

The results of optical microscope observation of each sample were referred to for further confirmation. It was confirmed in FIG. 2 that the component of the try cock samples at the second and third stages was a rag. It was found therefrom that the rag layer was formed in the desalter vessel corresponding to the position of the try cocks at the second and third stages. These results are consistent with the results estimated from the measurement of the density of each sample.

Therefore, it was found therefrom that the position of the rag layer in the desalter vessel may be confirmed by measurement of the density of the component in the desalter vessel.

In addition, prior to the analysis, each sample was visually observed, and it was easily visually determined that the component of the try cock samples at the second and third stages was a rag. It is considered that this was because iron impurities were concentrated in a large amount. Therefore, in the case of the present invention, it was confirmed that the position of the rag layer was simply grasped by visual observation of each sample.

<Evaluation of Concentration of Iron Impurities in Rag Layer>

TABLE 1

TSS content of sample of Example 1

| Sample | TSS content (ppm) |
|---|---|
| Desalted oil | 138.4 |
| Try cock at fifth stage | 148.6 |
| Try cock at fourth stage | 433.4 |
| Try cock at third stage | 19333.0 |
| Try cock at second stage | 27821.6 |
| Try cock at first stage | 49.2 |

TABLE 2

Metal component content of sample of Example 1

| Sample | Fe(ppm) | Ca(ppm) | Mg(ppm) | Na(ppm) |
|---|---|---|---|---|
| Desalted oil | 20 | 12 | N/D | 2 |
| Try cock at fifth stage | 32.9 | 10.1 | N/D | 82.4 |
| Try cock at fourth stage | 35.9 | 9.5 | N/D | 6.4 |
| Try cock at third stage | 2835.9 | 305.2 | N/D | 253.3 |
| Try cock at second stage | 5689.5 | 578.2 | 35.8 | 423.5 |
| Try cock at first stage | 0.6 | 21.9 | 30.3 | 389.2 |

As confirmed in Table 1, the try cock samples at the second and third stages showed a significantly higher TSS content relative to the other samples.

In addition, as confirmed in Table 2, the iron (Fe) content values of the try cock samples at the second and third stages were about 280 times and 150 times the iron content values of the desalted oil sample, respectively, about 170 times and 80 times the iron content value of the try cock sample at the fifth stage, respectively, and about 160 times and 80 times the iron content value of the try cock sample at the fourth stage, respectively, which showed a significant difference.

Therefore, taken together with the prior results of <Analysis of position of rag layer>, it was found that the iron impurities were concentrated at a significantly high content in the rag layer in the desalter vessel.

Example 2

The crude oil desalting process was performed in a desalter vessel having a total height of 3658 mm to which try cocks were attached at the first to sixth stages, instead of the desalter vessel of Example 1. Each try cock was attached to the positions of heights of 737 mm at the first stage, 991 mm at the second stage, 1245 mm at the third stage, 1499 mm at the fourth stage, 1753 mm at the fifth stage, and 2007 mm at the sixth stage.

The components in the desalter vessel at the corresponding position were sampled by each try cock, and other than that, the process was performed in the same manner as in Example 1.

The TSS content was measured according to ASTM D4807-05, and the results are shown in Table 3.

Comparative Example 1

The process was performed in the same manner as in Example 2, except that the iron reducing agent was not used.

The components inside the desalter vessel at the corresponding position were sampled by each try cock, the TSS content of each sample was measured, and the results are shown in Table 3.

TABLE 3

Comparison of TSS content (ppm) of samples of Example 2 and Comparative Example 1

| Sample | Example 2 | Comparative Example 1 |
|---|---|---|
| Try cock at sixth stage | 124 | 27 |
| Try cock at fifth stage | 137 | 105 |
| Try cock at fourth stage | 216 | 146 |
| Try cock at third stage | 17600 | 246 |
| Try cock at second stage | 13300 | 46 |
| Try cock at first stage | 10 | 8 |

As confirmed in Table 3, the try cock samples of Example 2 at the second and third stages showed a significantly high TSS content. In addition, considering the prior analysis results of Tables 1 and 2, particularly the iron content would be high in the sample.

That is, in Example 2 using the iron reducing agent, a significantly high content of iron impurities was concentrated in the rag layer in the desalter vessel.

However, the sample of Comparative Example 1 showed a relatively low TSS content. That is, it was found that the iron impurities were not concentrated in the rag layer, dispersed in the desalted oil layer, and continuously discharged to subsequent process equipment.

Example 3

In Example 1, the position of the rag layer was confirmed according to the method of <Analysis of position of rag layer>, and then the rag layer was selectively removed through an outlet.

As described above, it was confirmed that the upper interface of the rag layer was formed at the position between the try cocks at the third and fourth stages, and the lower interface of the rag layer was formed at the position between the try cocks at the first and second stages. Therefore, the rag layer was discharged to centrifugation equipment using an outlet attached to the position between the try cocks at the first and second stages, among a plurality of outlets.

Figure 3:
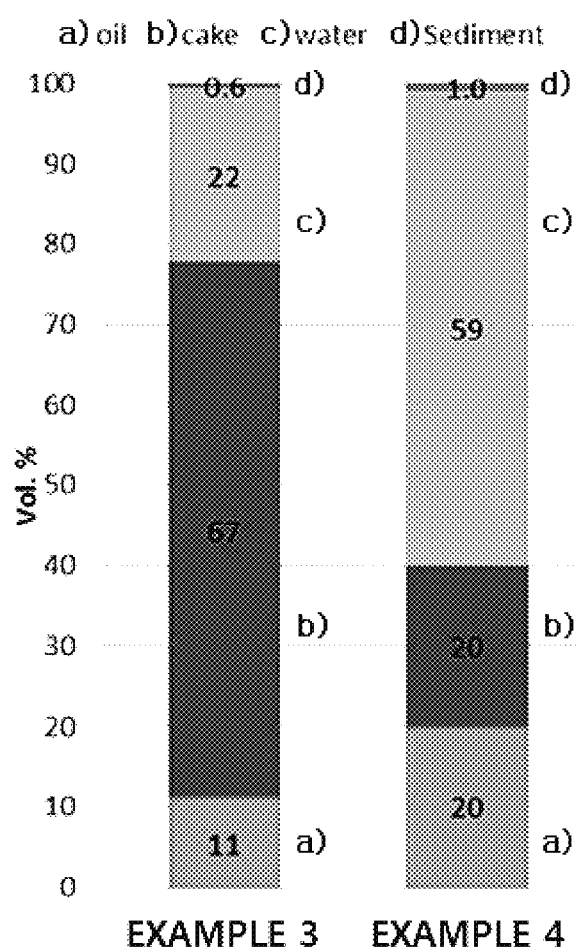
FIG. 3 shows volume % of each layer formed after centrifugation of rag layers in Examples 3 and 4.

The rag layer discharged thereafter was centrifuged for 10 minutes under conditions of 50° C. and 2500 rpm, and the volume % of each layer formed as a result of separation is shown in FIG. 3.

Example 4

The process was performed in the same manner as in Example 3, except that centrifugation was performed by heating to 75° C., and the volume % of each layer formed as a result of separation is shown in FIG. 3.

<Results of Centrifugation of Rag Layer>

As a result of centrifugation of the rag layer, an oil layer was formed in an upper portion, a water layer was formed in a lower portion, and a semi-solid cake layer was formed therebetween.

As confirmed in FIG. 3, in Example 3 in which centrifugation was performed at 50° C., the cake layer showed 67 vol % and the oil layer showed 11 vol % relative to the total volume.

However, in Example 4 in which centrifugation was performed by heating to 75° C., the cake layer was 20 vol % relative to the total volume which was decreased by three times, and the oil layer was 20 vol % relative to the total volume which was increased by twice.

The oil layer was easily collected and used, while the cake layer needed additional treatment or was discarded.

Therefore, in the case of retreatment using centrifugation, implement under a heating condition as in Example 4 is more advantageous, for excellent retreatment efficiency.

According to the present invention, iron impurities and a rag layer which negatively affect an oil refining process and a crude oil desalting process may be efficiently and effectively removed. Thus, the efficiency of an oil refining process and a crude oil desalting process may be significantly improved.

In addition, in the present invention, the position and the thickness of the rag layer are confirmed before removal of the rag layer, so that the rag layer is selectively removed at optimal timing. Thus, the efficiency of a crude oil desalting process may be significantly improved.

What is claimed is:

1. A method of desalting crude oil, the method comprising:
   (a) introducing an emulsion including crude oil, water, and an iron reducing agent to a desalter vessel;
   (b) subjecting the emulsion to oil-water separation to form a desalted oil layer, a water layer, and a rag layer in which iron impurities are concentrated by removing an oil film from oil-wetted iron particles;
   (c) confirming a position and a thickness of the rag layer to determine removal timing of the rag layer; and
   (d) removing the rag layer,
   wherein the iron reducing agent may be one or more selected from the group consisting of polyol, polyether, polythiol, polysulfide and polysulfate, and
   the iron impurities are iron particles and water-insoluble iron salts.

2. The method of desalting crude oil of claim 1, wherein in step (c), a plurality of try cocks attached to positions of different heights from each other of the desalter vessel are used to confirm the position and the thickness of the rag layer by sampling a component in the desalter vessel.

3. The method of desalting crude oil of claim 2, wherein the plurality of try cocks are attached to positions of a 20 to 60% height with respect to a total height of the desalter vessel.

4. The method of desalting crude oil of claim 1, wherein in step (c), a density profiler installed in the desalter vessel is used to confirm the position and the thickness of the rag layer by measuring the density of a component in the desalter vessel in real time.

5. The method of desalting crude oil of claim 1, wherein step (d) is performed when an interface between the rag layer and the desalted oil layer is formed at a position of a 40 to 50% height with respect to the total height of the desalter vessel.

6. The method of desalting crude oil of claim 1, wherein step (d) is performed when the rag layer has a 10 to 30% thickness with respect to the total height of the desalter vessel.

7. The method of desalting crude oil of claim 1, wherein in step (d), among a plurality of outlets attached to positions of different heights from each other of the desalter vessel, any one or more outlets attached to a position confirmed as the rag layer in step (c) are used to remove the rag layer.

8. The method of desalting crude oil of claim 7, wherein the plurality of outlets are attached to positions of a 20 to 60% height with respect to the total height of the desalter vessel.

9. The method of desalting crude oil of claim 7, wherein in step (d), a density profiler installed in the outlet used to remove the rag layer is used to prevent the desalted oil layer from being removed together when the rag layer is removed.

10. The method of desalting crude oil of claim 1, further comprising: step (e) retreating the removed rag layer after performing step (d).

11. The method of desalting crude oil of claim 10, wherein step (e) includes centrifuging the removed rag layer to form an oil layer, a water layer, and a cake layer.

12. The method of desalting crude oil of claim 11, wherein the centrifuging is performed at a temperature of 70° C. to 90° C.

* * * * *